J. NEWMANN.
ROLLER BEARING.
APPLICATION FILED OCT. 13, 1910. RENEWED JULY 29, 1911.
1,003,495.
Patented Sept. 19, 1911.
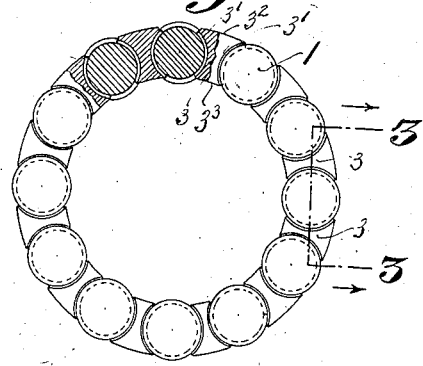
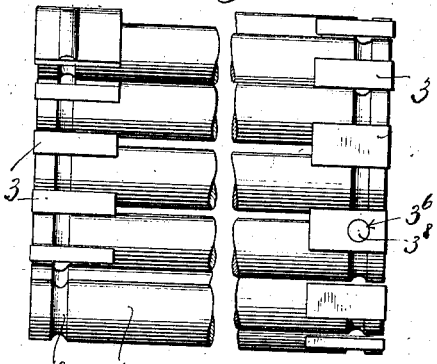
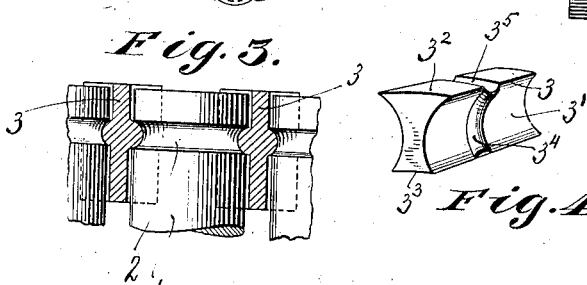
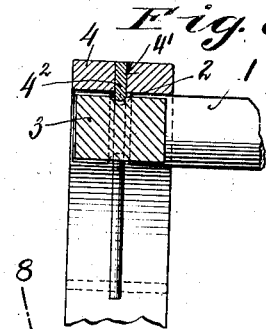
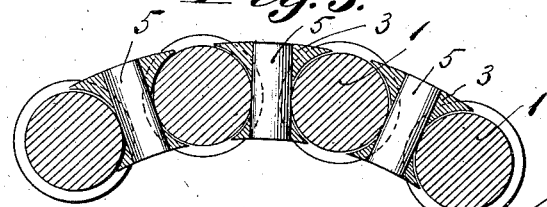
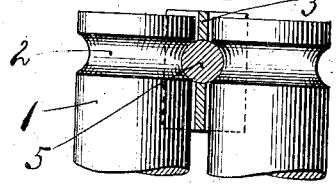
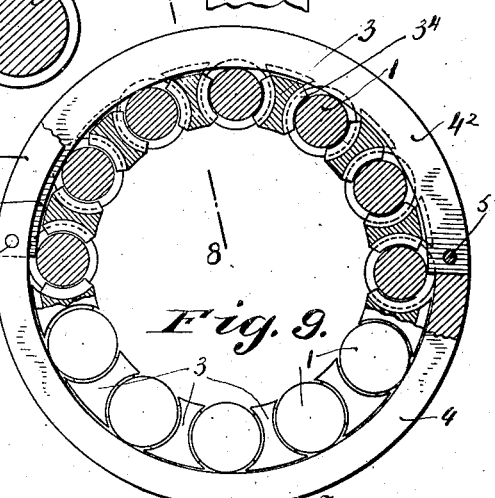
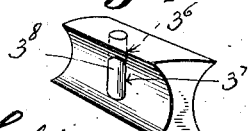
Witnesses:
Harry C. Hebig
R. Brockman
Inventor
John Newmann
By his Attorney

UNITED STATES PATENT OFFICE.

JOHN NEWMANN, OF BROOKLYN, NEW YORK.

ROLLER-BEARING.

1,003,495.  Specification of Letters Patent.  Patented Sept. 19, 1911.

Application filed October 13, 1910, Serial No. 586,930. Renewed July 29, 1911. Serial No. 641,384.

*To all whom it may concern:*

Be it known that I, JOHN NEWMANN, a citizen of the United States of America, residing at Brooklyn, in the county of Kings and State of New York, have invented certain new and useful Improvements in Roller-Bearings, of which the following is a specification.

The present invention pertains to roller bearings of the kind specified in my Patent No. 969,763 and my application Ser. No. 566,476 and has for its object to provide a construction, whereby the manufacture of such roller bearings will be greatly simplified.

In the accompanying drawing, similar reference numerals denote corresponding parts and Figure 1 is an end view of the roller bearing; Fig. 2 an elevation; Fig. 3 a section on line 3—3 of Fig. 1; Fig. 4 a perspective view of a detail; Figs. 5 and 6 are similar views as Figs. 1 and 3 of a modification; Fig. 7 a perspective view of the end block $x\ x$; Fig. 8 a section on line 8—8 of Fig. 9 and Fig. 9 an end view of the modified roller bearing.

My roller bearing comprises rollers 1 having annular grooves 2 and loose blocks 3 exclusively, in lieu of the combination of end pieces having rigid blocks with loose blocks, as described in my prior application above referred to. The loose blocks 3, 1 form substantially as those shown in my said prior application, *i. e.* with concaved side surfaces $3'$ and cylindrically curved upper or outer and lower or inner surfaces $3^2$, $3^3$. These blocks, however, are not to contain balls, but instead are formed laterally and centrally with ribs $3^4$ of circular cross section and extending crosswise to the block in a curve conforming to that of the curvature of the concave side surface of the block. A ridge $3^5$ sufficiently deep is made in the upper or outer surface $3^2$ of the blocks to extend from one side rib $3^4$ to the other (Fig. 4). The rollers engage with their annular grooves the said lateral ribs of the blocks interposed between them (Figs. 1, 2 and 3), which ribs take the place of the balls used in the construction of my prior application.

To enable the assembling of the parts, one of the blocks necessarily must be differently constructed than the rest. For this purpose from one of the blocks, to be used as an end block, the ribs $3^4$ are omitted and instead the same is provided with a central cylindrical cross bore $3^6$ extending from the outer to the inner end surface of the block and which is wider than the central width of the block, so that lateral openings or slots $3^7$ are formed in the concaved side surfaces of the block (Fig. 7). Into this central cross bore a cylindrical plug $3^8$ is adapted to be passed after all the parts of the bearing are assembled, which plug at the sides of the plugs will partly project outward through the opening $3^7$ and engage the neck or groove 2 of the adjoining roller, completing the chain of the parts of the roller bearing.

To prevent the falling apart of the parts of the bearing, I employ a ring-shaped band or collar 4 to fit around the assembled blocks and rollers. This collar is partly recessed on its circumference as $4'$, and adapted to receive a circularly shaped bar $4^2$, which is somewhat wider than the width of the collar, so as to engage into the ridges $3^5$ of the blocks and into the annular grooves 2 of the rollers, and serve thus as thrust bearing and guide for the revolving parts. The band or bar $4^2$ may be secured in position by pins 5.

It will be readily seen that the construction of the roller bearing may be further modified by omitting the lateral ribs $3^4$ on the blocks and forming each block with a central bore similar to that of the block to be used as last locking block and using for each block a plug 6 (as shown in Figs. 5 and 6).

What I claim and desire to secure by Letters Patent is:

1. In a roller bearing, the combination with the rollers having annular grooves, of loose blocks interposed between said rollers and having lateral concaved ribs of circular cross section engaging said annular grooves.

2. In a roller bearing, the combination with the rollers having annular grooves, of loose blocks interposed between said rollers and having concaved side surfaces and concaved ribs of circular cross section engaging said annular grooves.

3. In a roller bearing, the combination with the rollers having annular grooves, of loose blocks interposed between said rollers and having cross ridges in their outer surfaces and a collar surrounding said rollers and blocks and adapted to engage the said ridges and annular grooves to serve as a thrust bearing and a guide.

4. In a roller bearing, the combination with the rollers having annular grooves, of a loose block interposed between said rollers, and having a central cross bore which has side openings and a plug passed into said bore and engaging through the said side openings the said annular grooves of the rollers.

5. In a roller bearing, the combination with the rollers having annular grooves, of loose blocks interposed between said rollers, each having a cross ridge in its outer surface, a collar surrounding said rollers and blocks and having a circumferential recess and a circularly curved bar secured in said recess and engaging the said ridges and annular grooves.

6. In a roller bearing, the combination with the rollers having annular grooves, of loose blocks interposed between said rollers, each having lateral concaved ribs of circular cross section engaging the said annular grooves, a block having a cross bore which has side openings and a plug passed into said bore and engaging through the said side openings the said annular grooves of the rollers.

In testimony whereof I affix my signature in presence of two witnesses.

JOHN NEWMANN.

Witnesses:
 JOHN T. CARMODY,
 MAX D. ORDMANN.